United States Patent Office 3,160,473
Patented Dec. 8, 1964

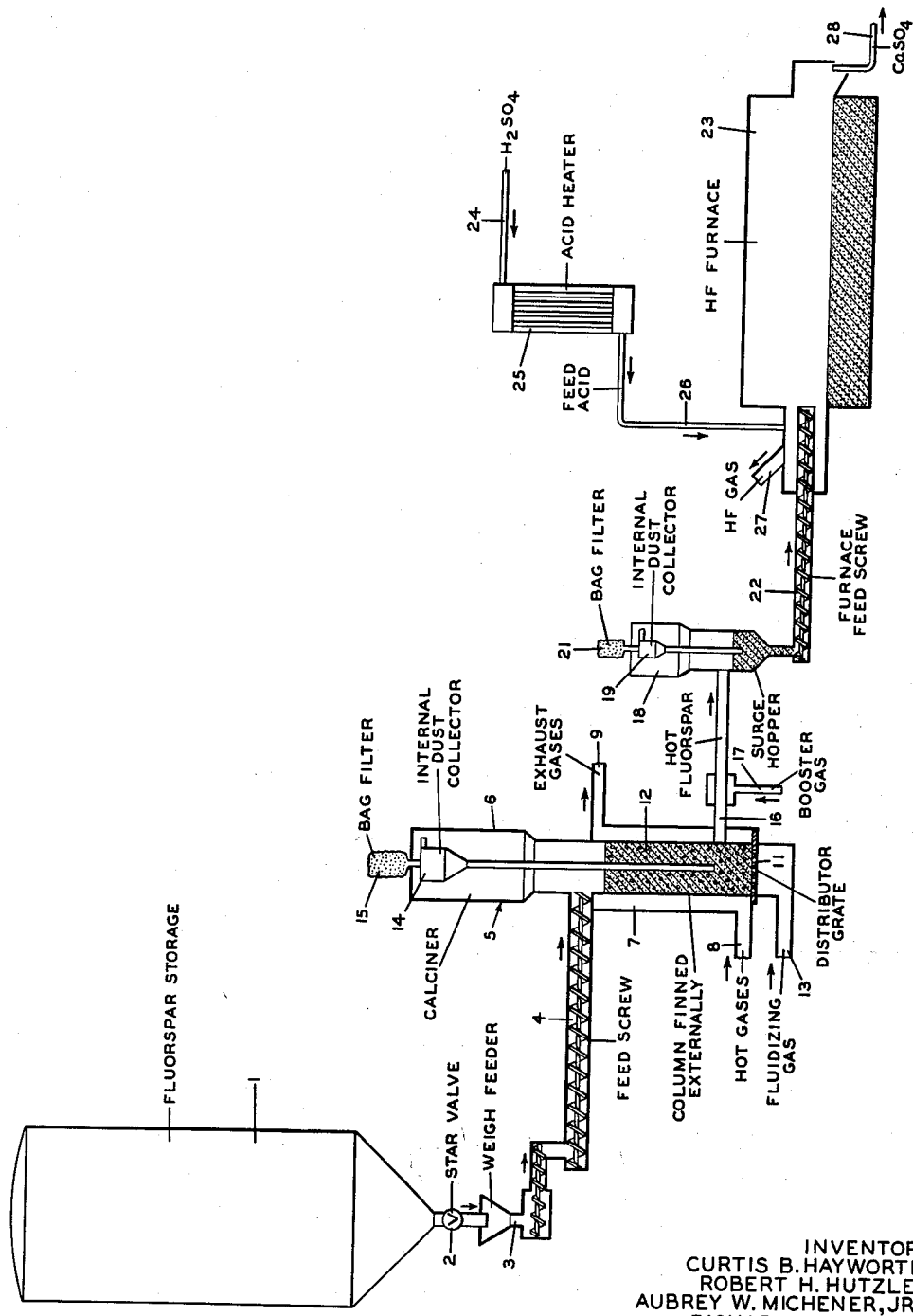

3,160,473
PROCESS FOR THE PRODUCTION OF HYDROGEN FLUORIDE AND CALCIUM SULPHATE
Curtis B. Hayworth, Morristown, N.J., Robert H. Hutzler, Wilmington, Del., Aubrey W. Michener, Jr., Rockaway Borough, N.J., and Richard Sobel, Claymont, Del., assignors to Allied Chemical Corporation, New York, N.Y., a corporation of New York
Filed Apr. 27, 1961, Ser. No. 105,992
4 Claims. (Cl. 23—153)

This invention relates to the manufacture of hydrogen fluoride and more particularly refers to a new and improved process for the production of hydrogen fluoride by reaction of fluorspar (calcium fluoride) with sulfuric acid.

For the past 30 or more years commercial production of hydrogen fluoride has been carried out by introducing fluorspar and sulfuric acid into an externally fired rotary kiln wherein the sulfuric acid reacts with the calcium fluoride to produce hydrogen fluoride and calcium sulfate. The evolved HF gas containing $SO_2$ and elemental sulfur as contaminants is withdrawn from the kiln and subjected to conventional purification by cooling, acid scrubbing, rectifying and stripping operations. A problem which plagued the art in the commercial manufacture of hydrofluoric acid has been the formation of hard lumps in the kiln as the reaction between the sulfuric acid and the spar proceeds thus decreasing the efficiency of heat transfer from the furnace shell to the reactants and materially reducing the capacity of the unit. Many years ago, U.S. Patent 1,748,735 of February 25, 1930, in order to counteract this situation, the expedient was adopted of inserting a number of heavy steel rails, sections of railroad rails of a length approximately equal to the interior longitudinal dimension of the kiln and weighing about 25 pounds per foot. These rails are tumbled freely in the bed by special lifters falling with considerable force (lighter rails were found unsatisfactory) and tend to break up the lumps as they develop. As can be appreciated the wear and tear and maintenance on the equipment due to the tumbling of these heavy rails is considerable and represents an appreciable item in the cost of operation. Nevestheless, the art knew no better method of operation and for decades practiced this procedure. Recently, Du Pont Patent 2,846,290 of August 5, 1958, in attempting to overcome the problem of lump formation long existing in the art suggested carrying out the reaction in the presence of chlorinated benzene as a diluent. This procedure has the drawbacks of requiring the use of large amounts of an expensive diluent, chlorinated benzene, contamination of the product, expansive procedure for removal of the chlorinated benzene as well as heat loss attendant its use.

An object of the present invention is to provide a method for reacting sulfuric acid and fluorspar to produce hydrogen fluoride without lamp formation.

A further object is to provide a more efficient method for producing hydrogen fluoride by reaction of fluorspar and sulfuric acid with increased plant capacity and lower maintenance cost.

A still further object is to provide a method for reacting fluorspar and sulfuric acid to produce hydrogen fluoride containing appreciably reduced amount of contaminants.

Other objects and advantages will be apparent from the following description and accompanying drawing.

In accordance with the present invention fluorspar and sulfuric acid are converted to hydrogen fluoride without lump formation, with purer hydrogen fluoride and with increased plant capacity by calcining the fluorspar at a temperature within the range of about 800–1300° F., preferably within the range of 900–1100° F., passing the heated, calcined fluorspar into an externally heated reaction zone, introducing sulfuric acid having a concentration of about 95–100% $H_2SO_4$, preferably 99–100% $H_2SO_4$, preferably at a temperature within the range of 200–350° F., in at least stoichiometric amount for reaction with the fluorspar, preferably in small stoichiometric excess of up to 20%, maintaining the reaction mixture in the reaction zone at a temperature within the range of 300–600° F., preferably within the range of 400–450° F., effect reaction of the sulfuric acid and the fluorspar to produce hydrogen fluoride and calcium sulfate, releasing evolved hydrogen fluoride from the reaction zone and discharging calcium sulfate from the reaction zone.

In the course of our investigation we discovered that precalcination of the fluorspar at a high temperature within the range of about 800–1300° F. caused some change such that when the heated calcined fluorspar was introduced into the kiln together with sulfuric acid for the production of hydrogen fluoride, lump formation was eliminated and it was no longer necessary to employ heavy steel rails, and furthermore, we obtained more efficient heat transfer in the kiln and the kiln operated at an increased capacity up to 50%. We do not know what physical or chemical changes in the properties in the fluorspar occur at the high temperature calcination but have noted the radical improvements resulting from such calcination. Temperature of calcination is important and should be within the range of about 800–1300° F., as temperatures materially below this range do not give satisfactory results. Another important advantage resulting from the high temperature calcination of the fluorspar is the elimination of an appreciable amount of naturally occurring impurities in the fluorspar which find their way into the hydrogen fluoride product and impose an expensive added burden for their removal. Fluorspar contains some organic constituents including organic sulfur compounds as well as sulfide sulfur compounds which fluorspar when treated in the conventional manner produces sulfur dioxide and elemental sulfur carried over as impurities in the hydrogen fluoride product. In the calcination operation in accordance with the present invention the organic constituents are destroyed and the sulfides are decomposed thereby eliminating these impurities with the result that the calcined fluorspar upon subsequent treatment with sulfuric acid produces a much purer hydrogen fluoride.

The accompanying drawing diagrammatically illustrates one method of carrying out the operation. Ground fluorspar is discharged from silo 1 by a rotary valve 2 and delivered to a weigh feeder 3, or other similar calibrated mechanism, and the material discharged at a controlled rate by feed screw 4 into calciner 5. A convenient means of calcining the fluorspar is in a fluidize column as illustrated in the drawing. The fluidizatio column is a vertical column 6 provided with a jacket through which hot gases, such as combustion gases, circulate, entering through line 8 and discharging throug line 9. To improve heating, the column may be finne externally. If desired, heating of the column may be accomplished by directing hot gases through a series of internal tubes. At locations where electrical power more economical or more practical, internal heating elements or winding on the outside of the heating column can furnish the heat required. Near the bottom of column is a horizontal distributor grate 11 which supports the bed 12 of fluidized fluorspar and which is perforated permit passage of fluidizing gas up through the be Fluidizing gas, such as air or oxygen-containing gas, e ters the bottom of column 6 through line 13 beneath d tributor grate 11 passing upward through bed 12 to mai tain the bed of solids in the fluidized state. The fluidizing gas may, if desired, be preheated to reduce the heat requirements of external heating of the column. The gas velocity of the fluidizing gas need only be sufficiently high to maintain the bed of solids 12 in the fluidized state. Usually a velocity of about 0.05–5 feet per second, dependent on the fineness of the particles of fluorspar, will be adequate. The fluidizing gas leaving the top of bed 12 passes into the expanded section at the top of column 6 wherein some of the particles of solid carried by the gas drop down to the bed. Any fine dust entrained in the fluidizing gas is trapped in internal dust collector 14 or in bag filter 15 and drops down to bed 12. After the fluorspar has been calcined at a temperature of 800–1300° F., usually calcination is completed at that temperature in a matter of minutes although longer times may be employed, the calcined fluorspar is withdrawn at the bottom of column 6 through a horizontal line 16 from a point just above distributor grate 11. Normally the weight of bed 12 will exert sufficient pressure to force fluorspar through line 16, but if needed, booster gases may be introduced through line 17 to facilitate carrying the hot fluorspar through horizontal discharge line 16. The booster gas may also be preheated to preclude cooling the fluorspar. The mixture of fluorspar and gases from line 16 enters surge hopper 18 wherein the fluorspar separates and settles in a compact mass at the bottom of hopper 18 which is preferably insulated to prevent loss of heat and the gases pass through internal dust collector 19 and bag filter 20 to trap elutriated dust which returned to the mass in the bottom of the hopper. From the bottom of surge hopper 18 the fluorspar is conveyed by furnace feed screw 22 into externally fired rotary furnace 23. Sulfuric acid preferably of about 99–100% concentration and in an amount in slight stoichiometric excess, preferably about 3–10% excess, enters through line 24, thence through acid heater 25 wherein it may be heated to a temperature between about 200–400° F., preferably 250–300° F. (materially higher temperatures are not desired because they create a corrosion problem), and then flows through line 26 into furnace 23. Externally fired rotary furnace 23 may be a conventional type except that heavy rails are not needed since reaction of the sulfuric acid with a fluorspar does not form lumps thereby enabling efficient heat transfer and increased plant capacity. The fluorspar and sulfuric acid reactants in furnace 23 maintained at a temperature within a range of about 300–600° F., preferably 400–450° F., react to form hydrogen fluoride which is released through discharge 27 and calcium sulfate which is discharged from furnace 23 through line 28.

The following example illustrates the present invention. Fluorspar ground to 70% −200 mesh size was withdrawn in regulated amount by means of a weigh feeder at the rate of 300 pounds per hour and then continuously by a feed screw into approximately the center of a vertical column having a diameter of 1 foot and a height of 8 feet. At the bottom of the column is disposed a distributor grate which supports a fluidized column of fluorspar having a height of 5 feet. A jacket surrounds the column through which hot combustion gases are circulated to maintain the fluidized bed at a temperature of 1000° F. Air at the rate of 160 cubic feet per hour is passed up through the distributor grate and through the bed of fluorspar solids in the column to maintain the bed in a fluidized state. 300 pounds per hour of calcined fluorspar was continuously discharged from the bottom of the column at a point just above the distributor grate and supplemented by 50 cubic feet per hour booster air was conveyed into a surge hopper wherein the solids separated from the gas and settled at the bottom of the hopper. The calcined fluorspar from the hopper was introduced into an externally fired rotary furnace which did not have steel rails at the rate of 300 pounds per hour and therein was admixed with 380 pounds per hour of 99.5% $H_2SO_4$ and the reactants maintained in the furnace at a temperature of about 450° F. Hydrogen fluoride gas evolved as a result of the reaction was released from the furnace at the rate of 140 pounds per hour and contained minor amounts of $SO_2$ and elemental sulfur, less than 1.0% and 0.1% respectively. Calcium sulfate, the other product of the reaction was discharged from the far end of the furnace at the rate of 490 pounds per hour.

Merely by way of comparison, it will be noted that a conventional operation requiring the heavy rails will have a capacity of about 30% less than that produced by the process in accordance with the present invention utilizing the same size kiln without heavy rails. Also, the maintenance and operating difficulties are considerably less and the hydrogen fluoride purer as compared with conventional operation.

Although certain preferred embodiments of the invention have been disclosed for purpose of illustration, it will be evident that various changes and modifications may be made therein without departing from the spirit and scope of the invention.

We claim:

1. A process for the manufacture of hydrogen fluoride which comprises calcining fluorspar in a separate zone at a temperature within the range of about 800–1300° F. by passing an oxygen-containing gas through said separate zone in direct and intimate contact with a bed of fluorspar in said zone to maintain the bed in a fluidized state, passing the heated, calcined fluorspar into an externally heated separate reaction zone, concurrently introducing sulfuric acid in at least stoichiometric amount for reaction with the fluorspar into the externally heated reaction zone in admixture with the fluorspar, maintaining the reaction mixture in the reaction zone at a temperature within the range of about 300–600° F. to effect reaction of the sulfuric acid and fluorspar to produce hydrogen fluoride and calcium sulfate, releasing evolved hydrogen fluoride from the reaction zone and discharging calcium sulfate from the reaction zone.

2. A process for the manufacture of hydrogen fluoride which comprises calcining fluorspar in a separate zone at a temperature within the range of about 900–1100° F. by passing an oxygen-containing gas through said separate zone in direct and intimate contact with a bed of fluorspar in said zone to maintain the bed in a fluidized state, passing the heated, calcined fluorspar into an externally heated rotary kiln, concurrently introducing sulfuric acid having a concentration of about 95–100% $H_2SO_4$ at a temperature within the range of 250–300° F. in an amount in small stoichiometric excess for reaction with the fluorspar into the externally heated kiln in admixture with the fluorspar, maintaining the reaction mixture in the kiln at a temperature within the range of about 400–450° F. to effect reaction of the sulfuric acid and fluorspar to produce hydrogen fluoride and calcium sulfate, releasing evolved hydrogen fluoride from the reaction zone and discharging calcium sulfate from the reaction zone.

3. A process for the manufacture of hydrogen fluoride which comprises continuously feeding fluorspar into a fluidized bed of fluorspar, continuously passing a fluidizing oxygen-containing gas upwardly through the bed to maintain the bed in a fluidized state, calcining said fluidized bed of fluorspar by heating at a temperature within the range of about 800–1300° F., continuously withdrawing heated, calcined fluorspar from the fluidized bed, continuously passing said heated, withdrawn fluorspar together with some fluidizing gas into a separation zone wherein the gas is separated from the fluorspar which settles in the separating zone in the form of a compact mass, continuously passing said settled, calcined fluorspar into an externally heated reaction zone, concurrently introducing sulfuric acid at a temperature within the range of 200–350° F. in at least stoichiometric amount for reaction with the fluorspar into the externally heated reaction zone in admixture with the fluorspar, maintaining the reaction mixture in the reaction zone at a temperature within the range of about 300–600° F. to effect reaction of the sulfuric acid and fluorspar to produce hydrogen fluoride and calcium sulfate, releasing evolved hydrogen fluoride from the reaction zone and discharging calcium sulfate from the reaction zone.

4. A process for the manufacture of hydrogen fluoride which comprises continuously feeding fluorspar into a fluidized bed of fluorspar, continuously passing a fluidizing oxygen-containing gas upwardly through the bed to maintain the bed in a fluidized state, calcining said fluidized bed of fluorspar by heating at a temperature within the range of about 900–1100° F., continuously withdrawing heated, calcined fluorspar from the fluidized bed, continuously introducing gas into the stream of withdrawn fluorspar to aid in its conveyance to a separating zone wherein the gas is separated from the fluorspar which settles in the separating zone in the form of a compact mass, continuously passing said settled calcined fluorspar into an externally heated rotary kiln, concurrently introducing sulfuric acid having a concentration of about 95–100% $H_2SO_4$ at a temperature within the range of 250–300° F. in an amount in small stoichiometric excess for reaction with the fluorspar into the externally heated kiln in admixture with the fluorspar, maintaining the reaction mixture in the kiln at a temperature within the range of about 400–450° F. to effect reaction of the sulfuric acid and fluorspar to produce hydrogen fluoride and calcium sulfate, releasing evolved hydrogen fluoride from the reaction zone and discharging calcium sulfate from the reaction zone.

References Cited in the file of this patent

UNITED STATES PATENTS

| | | |
|---|---|---|
| 1,150,415 | Bishop | Aug. 17, 1915 |
| 1,310,413 | Eberhardt | July 22, 1919 |
| 1,812,770 | Bishop | June 30, 1931 |
| 2,047,210 | Lawrence | July 14, 1936 |
| 3,004,829 | Boyle et al. | Oct. 17, 1961 |

OTHER REFERENCES

Perry's "Chemical Engineer's Handbook," 1941 Ed., pages 322–324. McGraw-Hill Book Co., Inc., N.Y.

Othmer's book on "Fluidization," pages 212, 221; 1956 Ed., Reinhold Publishing Co., N.Y.